United States Patent [19]

Mould

[11] 4,221,484
[45] Sep. 9, 1980

[54] SELECTION OF SPECTROPHOTOMETRIC OPERATING PARAMETERS

[75] Inventor: Henry M. Mould, Buckinghamshire, England

[73] Assignee: Perkin-Elmer Limited, Beaconsfield, England

[21] Appl. No.: 949,319

[22] Filed: Oct. 6, 1978

Related U.S. Application Data

[63] Continuation-in-part of Ser. No. 721,989, Sep. 10, 1976, abandoned.

[30] Foreign Application Priority Data

Sep. 12, 1975 [GB] United Kingdom ............... 37510/75

[51] Int. Cl.² .............................................. G01J 3/42
[52] U.S. Cl. .................................................. 356/319
[58] Field of Search ................................. 356/319-325

[56] References Cited

U.S. PATENT DOCUMENTS

| 3,942,893 | 3/1976 | Way | 356/325 |
| 3,976,378 | 8/1976 | Pratt | 356/325 |

FOREIGN PATENT DOCUMENTS 1442236 7/1976 United Kingdom .

Primary Examiner—F. L. Evans
Attorney, Agent, or Firm—S. A. Giarratana; F. L. Masselle; E. T. Grimes

[57] ABSTRACT

In spectrophotometric apparatus in which there are a plurality of operating parameters a system for selecting predetermined combinations of operating parameters is provided, having as many user operable main mode selection stations as there are main modes in the design range of the system and having a mode multiplying system which is adapted to modify, in response to the operative state of user operable control means, each main mode selected out of at least some of the main modes in the range, for converting the selected main mode into an auxiliary mode.

11 Claims, 1 Drawing Figure

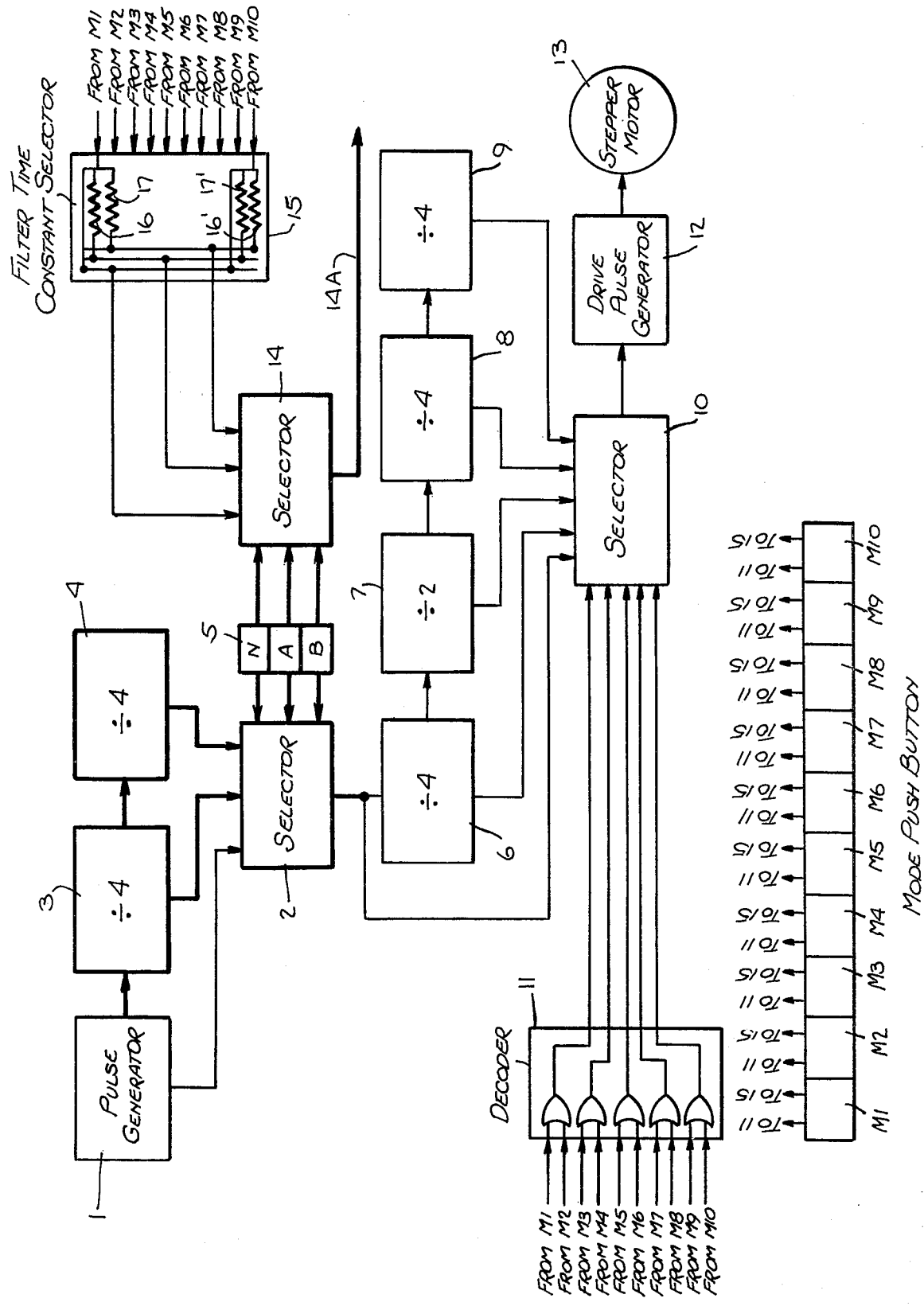

SELECTION OF SPECTROPHOTOMETRIC OPERATING PARAMETERS

This application is a continuation-in-part of my co-pending application Ser. No. 721,989 filed Sept. 10, 1976, now abandoned.

BACKGROUND OF THE INVENTION

This invention relates in general to apparatus of the type in which certain interrelated operating parameters must be set before use and, more particularly, to an improved spectrophotometric apparatus permitting the selection of predetermined combinations of operating parameters.

In certain known types of apparatus, a number of interrelated parameters must be set before use. In some of these, the operator is allowed free choice of parameters, each within a given range, and in some he is limited to predetermined combinations of operating parameters. This invention is concerned with apparatus providing the latter mode of operation, which will hereinafter be called "integrated mode". A typical apparatus in which integrated mode facilities may be found is a spectrophotometer, wherein the major operating parameters are resolution, noise filter time constant and wavenumber scan time.

The justification for integrated mode operation is the ease with which personnel can be instructed to use the spectrophotometer, as they are not required to seek the fine compromise that must be arrived at in trading off resolution and signal-to-noise ratio against each other while maintaining good line shape of the recorded spectrum and reasonable wavenumber scan times. By carefully matching the parameters of each selectable combination, the manufacturer effectively builds into the integrated mode system the skill and judgement of the professional analyst with years of experience behind him and makes it available to the novice at the touch of a button.

It would largely defeat the object to the convenience of the user thus provided if the selection of the preset combinations was not made easy and self-evident such as by providing an array of push buttons of reasonable size. Unfortunately, such an array takes up a great deal of panel space, with the result that the range of selectable combinations must be limited. This is perhaps the reason why integrated mode operation has appeared so far only as an ancillary to the operation normally provided in which the user has a free choice of parameters.

In the present context, the phrase "integrated mode" shall apply to any apparatus falling within the scope of the present invention and not just to spectrophotometers. Furthermore, the phase "main mode" shall be understood to refer to a predetermined combination of matched parameters included in the design range of an integrated mode system. The term "auxiliary mode" shall refer to a predetermined combination of matched parameters resulting from a modification of a main mode. Parameters are said to be matched when they conform at least approximately to a suitable criterion of apparatus performance.

SUMMARY OF THE INVENTION

The object of the present invention is to provide an improved spectrophotometric apparatus of the general type described above.

According to the present invention, there is provided in apparatus of that general type, an integrated mode system having as many user-operable main mode selection stations as there are main modes in the design range of the system and a mode multiplying system having user operable control means, the mode multiplying system being adapted to modify, in response to the operative state of the control means, each main mode selected out of at least some of the main modes in the range for converting the selected main mode into an auxiliary mode.

The mode multiplying system may be adapted to operate on some or all of the parameters accounted for in the main mode.

In a spectrophotometric application, it may be convenient to operate on filter time constant and wavenumber scan time only, which means that in deriving an auxiliary mode from a main mode, the resolution value will remain unaltered. If, for example, the auxiliary mode is intended to halve the noise while maintaining the same resolution as the main mode, the filter time constant and the wavenumber scan time must both be quadrupled in order to maintain parameter matching. Naturally, one could operate on resolution and scan time, leaving the filter time constant unchanged, in passing from a main mode to an auxiliary mode, but in terms of practicality an adequate selection of resolution values may be accommodated in the integrated mode system without undue crowding of the panel space so that the wider selection offered by the auxiliary modes is advantageously reserved for the two parameters that need it most.

The parameter matching criterion which conventionally applies in spectrophotometers is that of optimum filtering, which is met when a resolution interval is scanned in a constant number of noise filter time constants.

In the disclosed embodiment, the main mode selection stations are arranged as an arry of push buttons and the control means of the mode multiplying system as a few further buttons. Indexable rotary devices may also be used, if desired.

BRIEF DESCRIPTION OF THE DRAWING

The single FIGURE is a block diagram illustrating the application of the present invention as to a spectrophotometer in which an integrated mode system provides a selection of 10 main modes and a mode multiplying system provides an additional selection of 2 sets of 10 auxiliary modes, each set under the control of one push button.

DETAILED DESCRIPTION OF THE PREFERRED EMBODIMENT

The matched parameters included in each mode are resolution, filter time constant and wavenumber scan time, of which the latter two modified in deriving an auxiliary mode from a main mode. The parameter matching criterion used in all modes is that of optimum filtering as expressed above.

In the drawing, the output of a pulse generator 1, providing a p.r.f. (pulse repetition frequency) of 1600 pulses per second, is directly routed to selector 2 and also separately routed thereto via successive dividers 3 and 4, each applying a division by 4. Three push buttons marked N, A and B are installed within a control unit 5, which is the control means of the mode multiplying system of the present invention. The selector 2 routes through the output of pulse generator 1 when N is depressed and the outputs of dividers 3 and 4, respectively, when A and B, respectively, are depressed.

Whichever output is routed through the selector 2, it is further successively divided by 4 through divider 6; by 2, through divider 7; by 4 through divider 8; and finally by 4 again through dividers 9. The outputs of divider 6 to 9, respectively, are separately extended to the selector 10, to which there is also extended the output of selector 2.

Selector 10 is controlled by five inputs derived from decoder 11, which receives 10 input combinations corresponding to the 10 modes provided by the integrated mode system and decodes them into 5 outputs representing, from top to bottom, wavenumber scan times of 2.5, 10,20, 80 and 320 minutes. This means, of course, that some modes have scan times in common.

The output of decoder 11 corresponding to a scan time of 2.5 minutes acts as the control input of selector 10 which routes through the output of selector 2. The next one down routes through the output of divider 6; the next, that of divider 7; the next, that of divider 8; and the next, that of divider 9. The output of selector 10 is extended to a drive pulse generator 12 supplying the stepper motor 13 providing the wavenumber drive.

It is now clear that when push button N in unit 5 is depressed, the undivided frequency from pulse generator 1 is passed through the selector 2 to the selector 10 to provide a 2.5-minute scan time if the corresponding decoder output (i.e., top line) is operative. The same frequency is divided by 4 in divider 6, so that if the second output of decoder 11 is operative a 10-minute scan time will be provided, and so on for the remainder of the main modes.

When the A button is depressed instead (not that the action of the push buttons is mutually exclusive), the frequency passed through the selector 2 is 1600/4=400 and this means that 10 auxiliary modes are now available in which the scan times of the corresponding main modes have been multiplied by 4. Button B finally enables a second set of 10 auxiliary modes and in these the scan times are derived by multiplying by 16 those of the corresponding main modes.

The three push buttons also control selector 14, which when the N button is depressed routes through the output of the filter time constant selector 15, which corresponds to the unmodified mode and when button A or B is depressed routes through one of two outputs, each corresponding to an auxiliary mode of the main mode selected. Unit 15 receives ten unique inputs, M1 to M10, one for each selectable main mode, and provides three outputs for whichever input is selected. If, for example, the first input M1 is selected in unit 15, one of the three outputs is provided through a direct connection with the input (this is the output that is passed through selector 14 by depressing button N in unit 5) and the other two are provided via resistors 16 and 17, respectively (these being the outputs passed through selector 14 by depressing buttons A and B, respectively, in unit 5). The direct connection does not modify the filter time constant otherwise determined for the main mode. Resistor 16 modifies the main mode time constant by multiplying it by 4, to match the simultaneously modified scan time. Similarly, resistor 17 modifies the main mode time constant by multiplying it by 16, to match the simultaneously modified scan time. What has been described for the first input M1 applies to any of the ten inputs, M1 to M2, the last input M10 involving resistors 16' and 17'. The actual setting of the filter time constant is effected through a circuit (not shown) which responds to the resistance value at the output 14A of the selector 14.

The selectors 2 and 14 are well known devices in the electronic art. In their simplest form they may comprise three AND gates, each receiving one of the three signal inputs shown entering from the top and the corresponding gating input entering the side from unit 5. The outputs of the three AND gates form inputs of an OR gate, the output of which is the output of the selector.

In the drawing, the integrated mode system is represented by the parts drawn in thinner lines, the thicker lines being reserved for the mode multiplying system. Note, however, that the output of the pulse generator 1 would be routed directly to the divider 4 and the selector 10 if the mode multiplying system were not included. Similarly, the output of unit 15 would not be led to the selector 14 but would be passed straight to the time constant setting arrangement referred to earlier.

Push buttons M1 to M10 function as the selection stations of the integrated mode system. Each button that is depressed simultaneously selects one input of unit 15 and one input of unit 11. It has already been explained how each input to unit 15 gives rise to three outputs. In the case of the 10 inputs to unit 11, these are decoded into 5 outputs by any known decoding means such as, for example, the 5 OR gates shown, each gate receiving an input from two consecutive mode push buttons. The first OR gate from the top, for example, receives an input when either button M1 or M2 is depressed.

One of the advantages of the embodiment described is that a wide selection of modes is offered with a modest use of panel space. Furthermore, by ensuring that the main modes are sufficient to cover the range of resolution values conventionally used by spectroscopists, it has been possible through the mode multiplying system to provide such a wide choice of filter time constants and scan times as to secure the advantages of integrated mode operation without a significant sacrifice in operational flexibility.

In other words, a spectrophotometer making exclusive as distinct from ancillary use of integrated mode operation now becomes a practical reality for the first time.

What is claimed is:

1. Spectrophotometric apparatus comprising an integrated mode system including user operable main mode selection stations for enabling any one desired combination of operating parameters out of a range of predetermined combinations equal in number to said stations and a mode multiplying system including user operable control means for modifying in response to the operative state of said control means each main mode combination selected, out of at least some of the combinations in said range, for converting the selected main mode combination into an auxiliary mode combination.

2. Spectrophotometric apparatus as claimed in claim 1, wherein the mode multiplying system is adapted to modify some but not all of the parameters included in a main mode combination selected.

3. Spectrophotometric apparatus as claimed in claim 1, wherein the mode multiplying system is adapted to provide a plurality of ranges of auxiliary mode combinations.

4. Spectrophotometric apparatus as claimed in claim 1, wherein both main and auxiliary mode combinations include operating parameters that are matched in accordance with the given criterion.

5. Spectrophotometric apparatus as claimed in claim 1, wherein the integrated mode system provides matched combinations of resolution, wavenumber scan and filter time constant.

6. Spectrophotometric apparatus as claimed in claim 5, wherein a stepper motor provides the wavenumber scan drive and the integrated mode system comprises means for congtrolling the energization of the stepper motor at any one of a main mode range of frequencies selectable through the main mode selection stations, and wherein the mode multiplying system includes means for selectively modifying said frequencies in response to the operation of the control means so as to generate at least one auxiliary mode range of frequencies for controlling said energization.

7. Spectrophotometric apparatus as claimed in claim 6, comprising an oscillator for generating a basic frequency, a main mode frequency deriving means for generating said main mode range of frequencies from said basic frequency and main mode selector means for enabling the stepper motor energization frequency corresponding to the main mode selection station operated by the user.

8. Spectrophotometric apparatus as claimed in claim 7, comprising an auxiliary mode frequency deriving means for generating a range of additional frequencies from said basic frequency and an auxiliary mode selector means for routing to the main mode frequency deriving means either the basic frequency or one of said additional frequencies.

9. Spectrophotometric apparatus as claimed in claim 8, wherein the frequency deriving means of each mode comprise frequency dividers and the selector means for the main mode and the auxiliary mode comprise electronic selector means responsive to a digital code issuing from the main mode selection stations and the control means of the mode multiplying system respectively.

10. Spectrophotometric apparatus as claimed in claim 6, wherein said integrated mode system additionally comprises means for enabling any one of a main mode range of noise filter time constants selectable through the main mode selection stations, and means responsive to said control means and forming part of the mode multiplying system for selectively enabling either an unmodified main-mode filter time constant or one or more modified values thereof.

11. Spectrophotometric apparatus as claimed in claim 10, wherein whether the integrated mode system is operative alone or in conjunction with the mode modifying system, the parameters included in a selected combination of parameters are matched on the basis of optimum filtering.

* * * * *